(12) United States Patent
Inui et al.

(10) Patent No.: US 7,134,261 B2
(45) Date of Patent: Nov. 14, 2006

(54) HYBRID TYPE WORKING MACHINE

(75) Inventors: Tsutomu Inui, Saitama (JP); Hiroo Kanke, Saitama (JP); Tsutomu Wakitani, Saitama (JP); Toshiaki Kawakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 100 days.

(21) Appl. No.: 10/795,438

(22) Filed: Mar. 9, 2004

(65) Prior Publication Data

US 2004/0244346 A1    Dec. 9, 2004

(30) Foreign Application Priority Data

Mar. 13, 2003   (JP)   ............... 2003-067964

(51) Int. Cl.
*A01D 34/64* (2006.01)
(52) U.S. Cl. .................. 56/14.7; 318/151; 318/153; 318/157; 180/65.3
(58) Field of Classification Search ............ 172/42; 180/65, 1, 65.2, 65.3, 65.4, 64.5, 64.6; 56/11.9, 56/14.7; 477/3, 7
See application file for complete search history.

(56) References Cited

U.S. PATENT DOCUMENTS

| | | | | | |
|---|---|---|---|---|---|
| 4,337,405 | A | * | 6/1982 | Hishida .................. | 310/43 |
| 6,048,289 | A | * | 4/2000 | Hattori et al. ............. | 477/15 |
| 6,083,138 | A | * | 7/2000 | Aoyama et al. ........... | 477/5 |
| 6,449,934 | B1 | * | 9/2002 | Reimers et al. ........... | 56/14.7 |
| 6,554,088 | B1 | * | 4/2003 | Severinsky et al. ....... | 180/65.2 |
| 6,692,403 | B1 | * | 2/2004 | Charaudeau et al. ...... | 477/3 |
| 6,907,950 | B1 | * | 6/2005 | Notsu et al. ............... | 180/65.7 |
| 2002/0100624 | A1 | * | 8/2002 | Joong et al. ............... | 180/65.4 |
| 2002/0183161 | A1 | * | 12/2002 | Charaudeau et al. ...... | 477/3 |
| 2002/0189222 | A1 | * | 12/2002 | Reimers et al. ........... | 56/14.7 |
| 2004/0227348 | A1 | * | 11/2004 | Wakitani et al. .......... | 290/31 |
| 2004/0235613 | A1 | * | 11/2004 | Aoki et al. ................ | 477/3 |
| 2004/0244346 | A1 | * | 12/2004 | Inui et al. ................. | 56/11.9 |
| 2005/0001567 | A1 | * | 1/2005 | Yoshimatsu ............... | 318/34 |
| 2005/0057226 | A1 | * | 3/2005 | Kawakami et al. ........ | 322/24 |

FOREIGN PATENT DOCUMENTS

| | | |
|---|---|---|
| JP | 02-145118 | 6/1990 |
| JP | 2001-161104 | 6/2001 |
| JP | 2001-161114 | 6/2001 |

* cited by examiner

*Primary Examiner*—Victor Batson
(74) *Attorney, Agent, or Firm*—Westerman, Hattori, Daniels & Adrian, LLP.

(57) ABSTRACT

In the working machine wherein the output of an engine generator is directly supplied to a motor for travel without using the intermediary of a battery, preventing the engine from slowing down. The generator G is directly connected to the motor 7 and there is no battery that stores the output of the generator G. CPU 102 decreases the power supply for the motor 7 when it has been anticipated that the engine revolutions will be decreased. The number of the engine revolutions is detected according to the period of the waveform of an output of the generator G. The alternating current waveform that has been drawn out from one phase of the winding of the generator G is shaped into a rectangular waveform. CPU 102 detects the period of the shaped waveform. When the detected period has become larger, the CPU 102 determines that the engine revolutions is about to decrease.

5 Claims, 3 Drawing Sheets

HYBRID TYPE WORKING MACHINE

BACKGROUND OF THE INVENTION

1. Field of the Invention

The present invention relates to a hybrid type working machine that is equipped with an engine and an electric power-driven motor (motor) each of that serves as the power source, and more particularly to a hybrid type working machine that is constructed so that the output of a generator that is driven by the engine may be supplied directly to the motor without the intermediary of a battery.

2. Description of the Related Art

In a working machine such as a power tiller and lawn mower, in the ordinary working that is done outdoors, the machine that uses an engine as the power source, whereas, in the area where a low level of operation sounds is required, the machine that uses a motor as the power source was employed. Like this, conventionally, the working machine that is driven by the engine and that which is driven by the motor were individually separately employed uniquely to the use purposes.

In contrast, there have in recent years been proposed so-called hybrid type working machines that use both of the engine and motor as the power source in the way that they are used as hybridization. For example, a Japanese official gazette of Japanese Patent Application Laid-Open No. 2001-161114 discloses a car type farming working machine wherein a working machine is mounted to an automotive vehicle for travel, in which to a driving system for the working machine side and that for the generator that has been loaded on the automotive vehicle for travel there is transmitted the power that is delivered from the engine. And, when the load that is applied to the engine from the working machine is small in magnitude, the generator is driven by the surplus power of the engine, and the surplus energy is accumulated in a relevant battery as the electric power. This car type farming working machine is a hybrid type working machine that attaches importance to the efficient use of energy so that the load to the engine may be maintained within a proper range of values; and that the battery may be able to be used as the source of driving the motor.

On the other hand, in a Japanese official gazette of Japanese Patent Application Laid-Open No. 2001-161104, there is disclosed a hybrid type managing machine (working machine) wherein for driving the travel of a managing machine main body and for driving the generator there is used an engine power, whereby the managing machine main body is driven using a motor the power source of that is a battery that has been electrically charged by the generator. This hybrid type managing machine has been improved in operating efficiency with conceiving the easy controllability of a motor enabling simplifying the complex working-machine operation mechanism.

The above-described hybrid type working machine and managing machine each necessitate the use of a battery in order to store once the generation output of the generator that is driven by a relevant engine. Accordingly, even if the working machine is small in size, increasing the size, as well as increasing the weight, of it was inevitable by the extent to which the battery has been loaded.

SUMMARY OF THE INVENTION

The present invention has been made to solve the above-described points of problem and has an object to provide a hybrid type working machine that has no battery loaded thereon.

To attain the above object, the present invention has a first characterizing feature in that it provides a hybrid type working machine, having a generator that is driven by an engine and a motor that is driven by an electric power that is supplied from the generator, wherein the engine is controlled so as to perform a substantially fixed speed operation, while the motor is driven by having only an electric power directly supplied thereto that has been generated from the generator; and the machine comprises means that detects the fluctuation in the revolution of the engine to anticipate the decrease in the number of revolutions of the engine; and means that, when the decrease in the number of revolutions has been anticipated, decreases the amount of electric power that is supplied from the generator to the motor.

According to the first characterizing feature, unlike the arrangement wherein an auxiliary power source such as a battery is provided to store the output of the relevant generator; and from this auxiliary power source to the motor there is supplied an electric power, only the generator is directly connected to the motor without using the intermediary of a battery to use the output thereof as the power source for the motor. Accordingly, a battery and a structure for having that battery loaded thereon is unnecessary, whereby miniaturizing and weight-reducing the working machine can be achieved. Also, since the load with respect to the generator is mitigated when the number of revolutions of the engine is about to decrease, the load-driving force of the engine can be maintained at an appropriate level.

Also, the present invention has a second characterizing feature in that it provides a hybrid type working machine wherein, in the first characterizing feature, the machine is constructed in the way that the generator is a multi-polar generator; and the machine detects the fluctuation in the revolution of the engine by using the fluctuation in the power generation frequency of the multi-polar generator.

According to the second characterizing feature, by detecting the fluctuation in the frequency of the alternating current output that generates in units of one rotation of the generator correspondingly to the number of poles, it is possible to detect the rotation fluctuation per rotation of the engine with a high precision.

The present invention has a third characterizing feature in that is provides a hybrid type working machine wherein, in the preceding feature 1 or 2, the engine composes a driving source for a working-machine main body and the motor composes a driving source for movement of the working machine, whereby, when the decrease in the number of revolutions of the engine has been anticipated, the machine is constructed so that the moving speed of the machine may be decreased.

According to the third characterizing feature, by the moving speed's of the working machine being decreased when the number of revolutions of the engine is estimated to be about to decrease, it is possible to decrease the amount of work per unit length of time, and therefore the working load with respect to the machine can be decreased.

The present invention has a fourth characterizing feature in that it provides a hybrid type working machine wherein, in one of the preceding features 1 to 3, the working machine is a lawn mower; and the working machine is constructed in the way that working tool members for mowing lawn are driven by the engine; and the car wheels for moving the lawn mower are driven by the motor.

According to the fourth characterizing feature, when the load is being high as a result of the fact that the amount of lawn mowed is great or the lawn is being wet and the weight thereof is great, the moving speed of the lawn mower machine is decreased. As a result of this, the working load with respect to the engine is decreased with the result that the number of revolutions thereof is maintained at its appropriate level. This enables maintaining the excellency of the finishability that regards moving the lawn.

The present invention has a fifth characterizing feature in that it provides a hybrid type working machine wherein, in one of the preceding features 1 to 3, the working machine is a cultivator; and the working machine is constructed in the way that a rotary for cultivation is driven by the engine; and the car wheels for moving the cultivator is driven by the motor.

According to the fifth characterizing feature, since when the load with respect to the rotary is high the moving speed of the power tiller or plow is decreased with the result that the revolution of the engine is appropriately maintained, it is possible to stabilize the tilling operations irrespective of the fluctuation in the tilling depth.

DETAILED DESCRIPTION OF THE PREFERRED EMBODIMENTS

Figure 2:
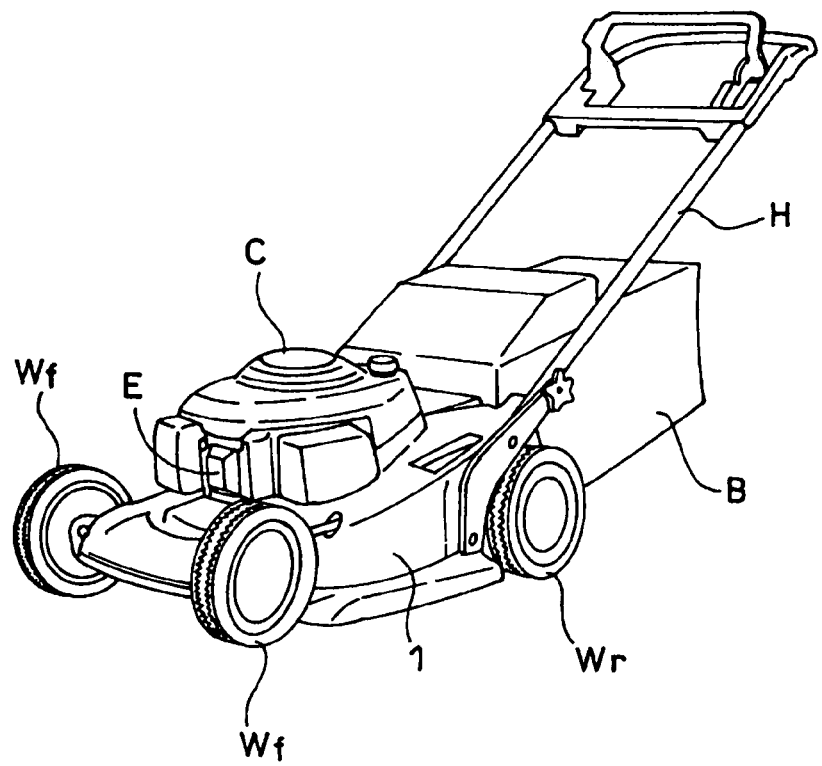
FIG. 2 is a perspective view of a lawn mower according to the embodiment of the present invention.
Figure 3:
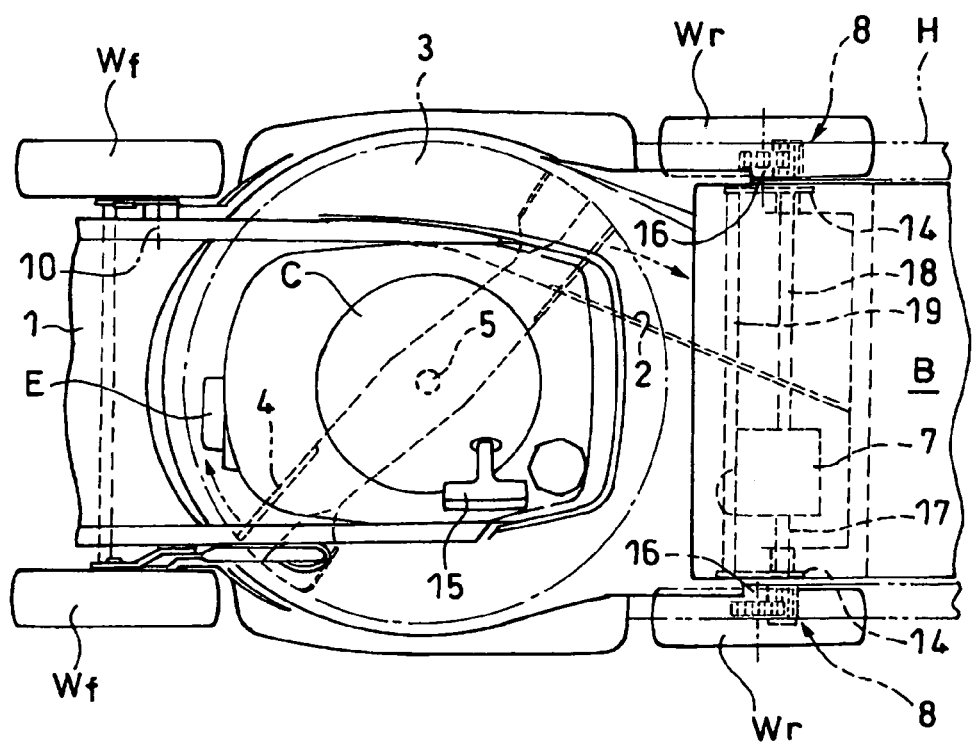
FIG. 3 is a plan view illustrating a main part of the lawn mower according to the embodiment of the present invention.

A description will be in detail given below of an embodiment according to the present invention with reference to the accompanying drawings. FIG. 2 is a perspective view of an entire of a lawn mower corresponding to the hybrid type working machine according to an embodiment of the present invention, and FIG. 3 is a plan view of a main portion of the lawn mower. In FIG. 2, a pair of front wheels Wf and Wf is suspended to a front portion of a cutter housing 1 in the lawn mower, and a pair of rear wheels Wr and Wr is suspended to a rear portion of the cutter housing. A vertical type engine E in which an output shaft or a crankshaft is vertically provided is mounted in a center portion of the cutter housing 1, and an engine cover C is put on an upper protruding portion of the engine E. An operation handle H extending so as to rearward ascend toward a rear side is provided in both sides of a rear portion of the cutter housing 1, and a grass bag B for receiving mown lawn grasses is provided in the rear portion of the cutter housing 1.

In FIG. 3, a hollow cylindrical cutter chamber 3 that is open in a lower surface, that is, a ground surface side is formed in a center portion of the cutter housing 1, and a blade cutter (a working machine main body) 4 is received in the cutter chamber 3. The blade cutter 4 is connected with a crankshaft 5 of the engine E, and is driven by the engine so as to rotate within the cutter chamber 3.

A lawn grass discharging port 2 extending rearward from an outlet of the cutter chamber 3 and communicating with the grass bag B (refer to FIG. 2) is formed in a right side of the cutter housing 1 in a forward moving direction. The lawn grasses mowed by the blade cutter 4 are propelled by a blower (not shown) and collected in the grass bag B through the lawn grass discharging port 2. Such the blade cutter 4 and the blower are generally designated as the working tool for lawn mowing.

Rear wheel supporting members 14, 14 are respectively arranged in both right and left sides of the rear portion of the cutter housing 1, and axles 16, 16 of the rear wheels Wr and Wr are suspended to the supporting members 14, 14. The right and left supporting members 14, 14 are connected to each other by a connecting shaft 19, and output shafts 17, 18 are provided in parallel to the connecting shaft 19. One ends of the output shafts 17 and 18 are connected to an electric motor 7, another ends of the output shafts 17 and 18 extend respectively to the supporting members 14, 14 and are connected to the axles 16, 16 of the rear wheels Wr and Wr via a reduction gear mechanism 8.

A recoil starter starting the engine E by using a starter rope is received within the engine cover C covering an upper portion of the engine E. A starter grip 15 connected with the starter rope (not shown) of the recoil starter is held in the engine cover C.

Figure 4:
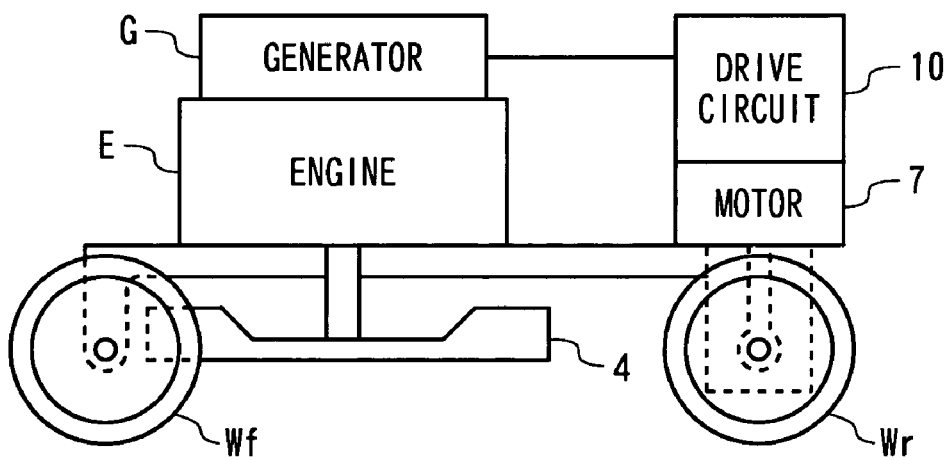
FIG. 4 is a block diagram illustrating the entire system of the lawn mower.

FIG. 4 is a block diagram illustrating the entire system of the lawn mower. A generator, which is connected to the engine E is provided on the lawn mower. The generator G is, for example, an outer rotor type three-phase AC generator. The output of the generator G is inputted to a drive circuit 10 for a motor 7, and the drive circuit 10 performs phase control on the alternating current that has been input from the generator G and supplies it to the motor 7. The motor 7 is, for example, a DC motor but may be a universal motor or the like as later described. The drive circuit 10 generates an output that conforms to that motor 7. The detail will be described later. The engine E can be switched in multiple stages to, for example, 3000, 2500, and 2000 rpm and the engine E is controlled so that it may be maintained at each of these numbers of revolutions, through the use of a mechanical type governor.

Figure 5:
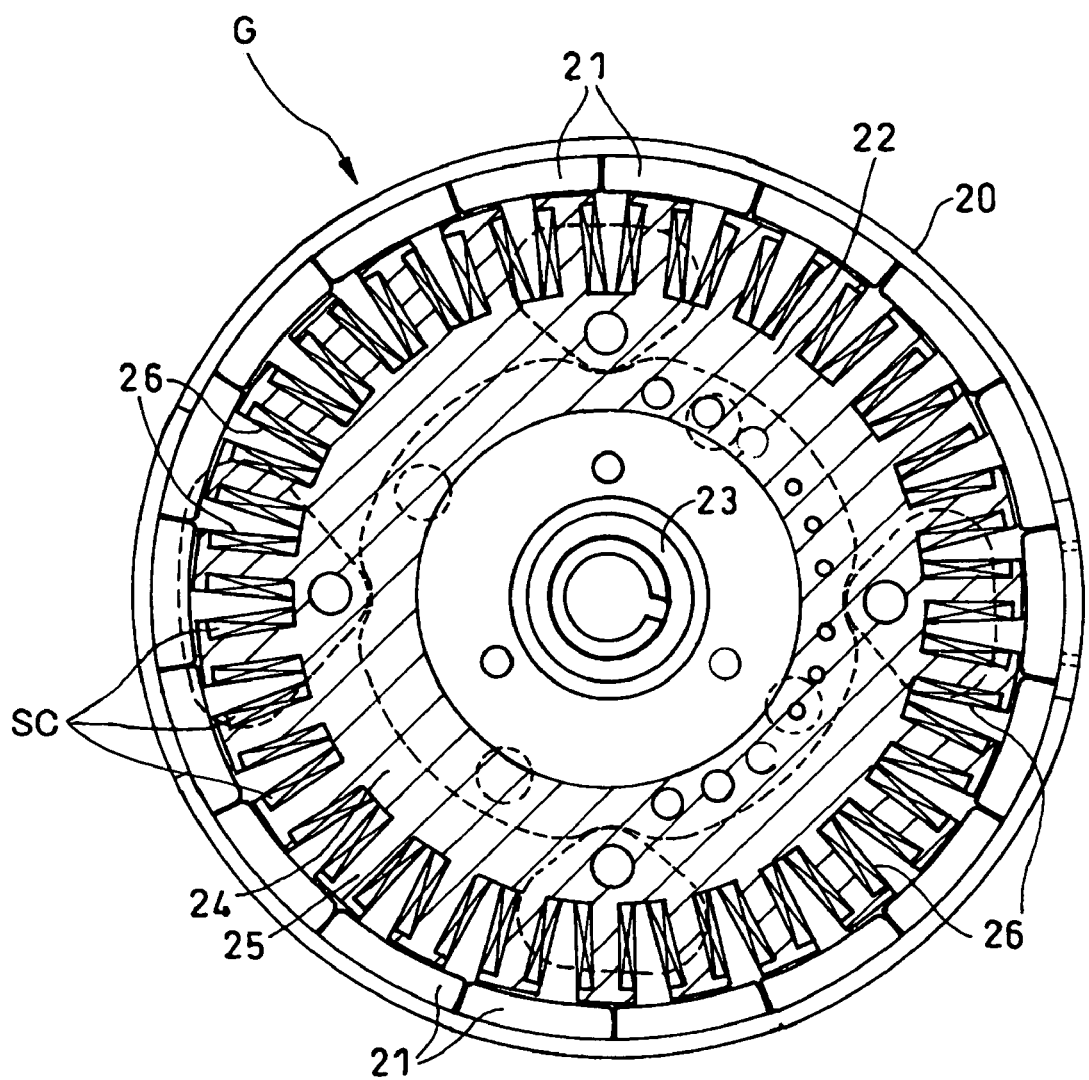
FIG. 5 is an exploded front view illustrating an example of a relevant generator.

FIG. 5 is an exploded front elevational view of the power generator G. The power generator G is provided with a flywheel rotor 20 formed in a basin shape or bottomed cylinder, eighteen permanent magnets 21 arranged in an inner peripheral surface of the rotor 20, and a stator 22 arranged in the inner periphery of the rotor 20 so as to oppose to the magnets 21. The rotor 20 is provided with a sleeve 23 connected with the crankshaft (not shown) of the engine E. The magnets 21 are structured such that north poles and south poles are polarized in an outer peripheral side and an inner peripheral side, and different polarities are opposed to each other in the adjacent respective magnets 21. A stator core 24 of the stator 22 extends radially, and is provided with twenty-seven salient poles 25 arranged so as to oppose to the inner peripheral side surface of the magnet 21. Around of the salient poles 25, single-phase windings SC that will be described later are coiled, while, around the other of the salient poles 25, coiled windings 26 are.

Figure 1:
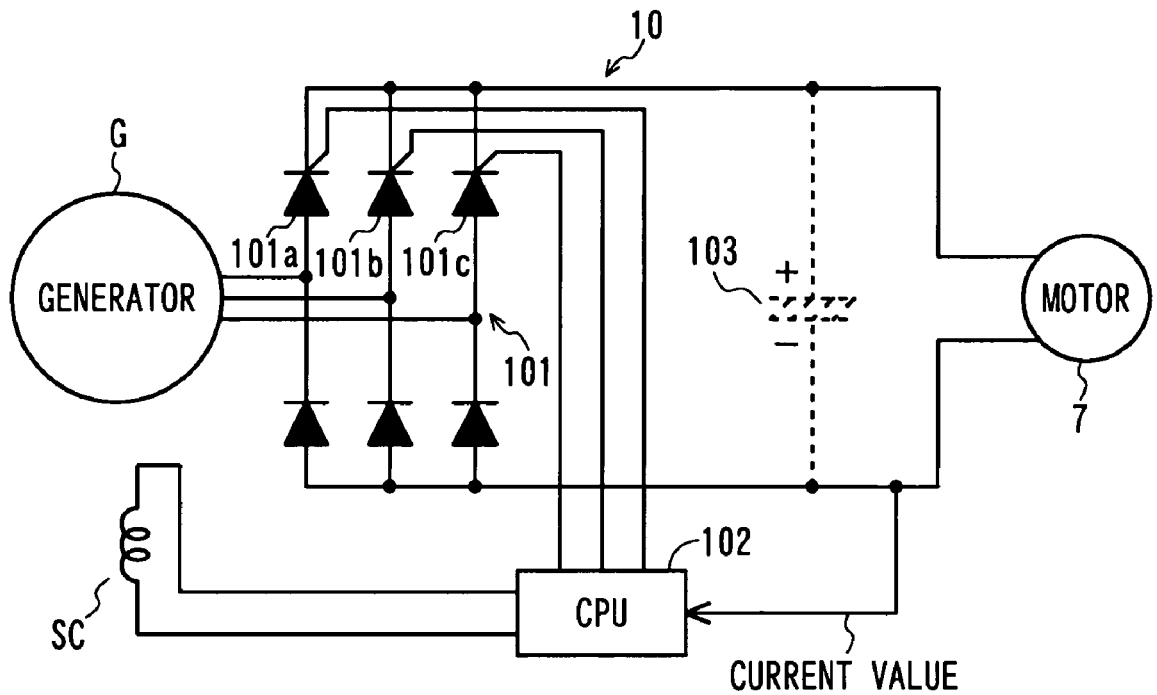
FIG. 1 is a drive circuit diagram of a drive circuit for a working machine according to an embodiment of the present invention.

In FIG. 1 there is illustrated an example of the drive circuit 10. The drive circuit 10 is equipped with a thyristor bridge 101 and a CPU 102. As indicated in dotted lines, a smoothing capacitor 103 may be provided therein. However, for achieving the miniaturization of the circuit unit, the use of that capacitor may be omitted. The motor 7 denotes a DC brush motor. The CPU 102 can obtain an electric power from a single-phase subsidiary winding (coil) SC of the generator G.

The CPU 102 monitors the fluctuation in the number of revolutions of the engine E and anticipates a status in which the number of revolutions is about to decrease. When the working load is about to increase up to a level that is greater than that corresponding to the output capacity, the number of revolutions of the engine tends to decrease. When the number of revolutions of the engine has decreased, there comes up an obstacle to performing the operation such as that of mowing lawn or the output itself of the engine decreases, finally raising the inconvenience such as the stall of the engine E. Thereupon, when it has been anticipated that the number of revolutions of the engine is about to decrease, it is carried out to decrease the electric power that is supplied to the motor 7. Resultantly, the load of the generator G is mitigated with the result that the decrease in the number of revolutions of the engine E is prevented. Resultantly, an excellent level of working operations can be carried out while the engine is kept in an appropriate state of engine revolutions. For example, in case of lawn mowing, it can be expected to obtain an excellent level of mowed finish with no unevenness. At this time, since the travel speed is decreased due to the decrease in the level of the electric power that is supplied to the motor 7, it results that the amount of work per unit length of time is decreased. Owing to this as well, the load is mitigated.

Performing phase control on the thyristors 101*a*, 101*b*, and 101*c* can perform controlling the amount of electric power supplied. Namely, by changing the electrical-conduction phase angle of the thyristor, i.e. on-timing of it, there is controlled the proportion of electrical conduction within the waveform of the output alternating current signal of the generator G. To decrease the amount of electric power supplied, the proportion of that electrical conduction is made small.

Whether the number of revolutions of the engine is about to decrease is determined as follows. In a 4-cycle engine, the crankshaft is accelerated during the explosion stroke, while it is decelerated during the compression stroke. Therefore, during from approximately the ending half of the explosion stroke up to approximately the end of the suction stroke, the crank-angular velocity is great. And, during the compression stroke, the crank-angular velocity is decreasing by degrees.

When the load with respect to the engine E increases, the degree in which the crank-angular velocity in the compression stroke decreases becomes increased. Thereupon, when the crank-angular velocity in that compression stroke has become small, it is determined that the number of revolutions of the engine is about to decrease.

The number of revolutions of the engine can be detected according to the period of the output alternating current signal waveform of the generator G. The generator G generates an alternating current waveform every period corresponding to the number of magnets 21. Thereupon, an output alternating current signal is drawn out from one phase of the three-phase windings of the generator G, and the waveform of the signal is shaped by known waveform shaping circuit into a waveform (rectangular waveform) that conforms to detecting the period to supply to the CPU 102. The CPU 102 counts the periods of the waveform that has been waveform shaped by using a counter and detects that period's number. When the periods that have been detected have become greater in number than a value that is determined beforehand, the CPU 102 determines that the number of revolutions of the engine is about to decrease. And, the CPU 102 issues an ON command to the thyristors so that the electrical conduction angle for the thyristors 101*a*, 101*b*, and 101*c* may be made small. The greater the number of poles of the generator G, the higher the output frequency of it. This enables detecting the fluctuation in the number of revolutions of the engine with a high precision.

Instead of determining the decrease in the crank-angular velocity during the compression stroke, the decrease in the number of revolutions of the engine may be determined by detecting the percentage of decrease in the angular velocity, i.e. the decrease in the angular acceleration and comparing the latter with an angular acceleration that serves as a reference.

In a case where the invention has a governor-controlled function that controls the opening of the throttle according to the number of revolutions of the engine and thereby maintains the number of revolutions of the engine at a value that is predetermined, it is possible to determine that the number of revolutions of the engine is about to decrease according to that degree of opening of the throttle. Namely, although if the opening of the throttle is in a range of control the number of revolutions of the engine can be maintained as is, if that opening becomes greater than a value falling with the range of control, it is anticipated that the number of revolutions of the engine becomes unable to be maintained as is.

The amount of electric power supplied to the motor 7 can also be decreased as follows. The motor 7 is controlled so that, even when causing fluctuation in the number of revolutions of the engine, the lawn mower can travel with a target speed. When the number of revolutions of the engine fluctuates, an alternating current output voltage of the generator fluctuates. Therefore, the value for controlling the motor 7 is determined so that the vehicle speed may be maintained as is by detecting the alternating current output voltage and correspondingly to that voltage. Namely, the amount of electric power that is supplied to the motor 7 is controlled correspondingly to the number of revolutions of the engine. Accordingly, if when it has been anticipated that the number of revolutions of the engine decreases the target vehicle speed (the vehicle speed indication value) is made small, since this means that the vehicle speed is controlled so that it may decrease, the amount of electric power supplied is decreased.

Although in the above-described embodiment the lawn mower has been described as an example of working machine, the invention is not limited thereto. The invention can be applied to various types of working machines, such as a plowing rotary and snow clearing auger of a power tiller and snow clearer, that include a working machine main body equipped with working tool members that are driven by an engine as well as a vehicle body that is driven by a motor for moving the working machine main body in the manner in which the vehicle body has it loaded thereon or has it connected thereto.

Also, the motor 7 is not limited to the one that is used as a travel-driving source for a vehicle body. The point is that that motor needs only to be driven by having directly supplied thereto an electric power that is generated from the engine generator and be constructed in the way that when the number of revolutions of the engine has become about to decrease the electric power supplied to the motor is decreased to enable mitigating the load with respect to the engine generator.

What is claimed is:

1. A hybrid type working machine, having a generator that is driven by an engine and a motor that is driven by an electric power that is supplied from the generator, comprising:

the engine is controlled so as to perform a substantially fixed speed operation, while the motor is driven by having only an electric power directly supplied thereto that has been generated from the generator means that detects the fluctuation in the revolution of the engine to anticipate the decrease in the number of revolutions of the engine;

means that, when the decrease in the number of revolutions has been anticipated, decreases the amount of electric power that is supplied from the generator to the motor, and wherein the engine composes a driving source for a working-machine main body and the motor composes a driving source for movement of the working machine, whereby, when the decrease in the number of revolutions of the engine has been anticipated, the machine is constructed so that the moving speed of the machine may be decreased.

2. A hybrid type working machine according to claim 1, wherein the machine is constructed in the way that the generator is a multi-polar generator; and the machine detects the fluctuation in the revolution of the engine by using the fluctuation in the power generation frequency of the multi-polar generator.

3. A hybrid type working machine according to claims 1 or 2, wherein the working machine is a lawn mower; and the working machine is constructed in the way that working tool members for mowing lawn are driven by the engine; and the car wheels for moving the lawn mower are driven by the motor.

4. A hybrid type working machine according to claim 1, wherein the working machine is a lawn mower; and the working machine is constructed in the way that working tool members for mowing lawn are driven by the engine; and the car wheels for moving the lawn mower are driven by the motor.

5. A hybrid type working machine according to claims 1 or 2, wherein the working machine is a cultivator; and the working machine is constructed in the way that a rotary for cultivation is driven by the engine; and the car wheels for moving the cultivator is driven by the motor.

* * * * *